(12) United States Patent
Malekpour

(10) Patent No.: US 10,736,062 B2
(45) Date of Patent: Aug. 4, 2020

(54) SYSTEM AND METHOD TO SYNCHRONIZE CLOCKS ACROSS A DISTRIBUTED NETWORK OF NODES

(71) Applicant: U.S.A. AS REPRESENTED BY THE ADMINISTRATOR OF NASA, Washington, DC (US)

(72) Inventor: Mahyar R. Malekpour, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 88 days.

(21) Appl. No.: 15/974,254

(22) Filed: May 8, 2018

(65) Prior Publication Data

US 2018/0332548 A1 Nov. 15, 2018

Related U.S. Application Data

(60) Provisional application No. 62/503,530, filed on May 9, 2017.

(51) Int. Cl.
*H04W 56/00* (2009.01)
*H04W 64/00* (2009.01)
(Continued)

(52) U.S. Cl.
CPC ............ *H04W 56/001* (2013.01); *G01S 5/14* (2013.01); *G01S 13/46* (2013.01); *G01S 13/876* (2013.01);
(Continued)

(58) Field of Classification Search
CPC ............................. H04W 56/001; G01S 5/14
See application file for complete search history.

(56) References Cited

U.S. PATENT DOCUMENTS 7,792,015 B2   9/2010   Malekpour
7,996,714 B2   8/2011   O'Connell et al.
(Continued)

OTHER PUBLICATIONS

Biely, M. et al., "Synchronous Consensus Under Hybrid Process and Link Failures", Theoretical Computer Science, 2011, pp. 5602-5630, vol. 412, No. 40.
(Continued)

*Primary Examiner* — Samina F Choudhry
(74) *Attorney, Agent, or Firm* — M. Bruce Harper; Andrea Z. Warmbier; Helen M. Galus

(57) ABSTRACT

Systems, methods, and devices of the various embodiments may provide for synchronizing clocks across a distributed network of nodes. Various embodiments include an autonomous distributed fault-tolerant local positioning system, a fault-tolerant GPS-independent autonomous distributed local positioning system, for static and/or mobile objects, and/or solutions for providing highly-accurate geo-location data for static and/or mobile objects in dynamic environments. Various embodiments enable faulty Echo message recovery using trilateration from locally time-stamped events obtained from other nodes in a distributed network of nodes. Using the faulty Echo message recovery techniques, in addition to clock synchronization various embodiments may enable object detection and location.

20 Claims, 5 Drawing Sheets

(51) Int. Cl.
*G01S 5/14* (2006.01)
*G01S 13/46* (2006.01)
*H04L 7/00* (2006.01)
*G01S 13/87* (2006.01)
*G04G 7/00* (2006.01)
*G04C 11/00* (2006.01)
*G01S 7/00* (2006.01)

(52) U.S. Cl.
CPC ............ *G01S 13/878* (2013.01); *G04C 11/02* (2013.01); *G04G 7/02* (2013.01); *H04L 7/0016* (2013.01); *H04W 64/00* (2013.01); *G01S 7/003* (2013.01); *G01S 2013/466* (2013.01)

(56) References Cited

U.S. PATENT DOCUMENTS

| | | | |
|---|---|---|---|
| 8,255,732 | B2 | 8/2012 | Malekpour |
| 8,473,663 | B2 | 6/2013 | Somervill et al. |
| 8,861,552 | B2 | 10/2014 | Malekpour |
| 10,025,344 | B2 | 7/2018 | Malekpour |
| 2009/0213828 | A1* | 8/2009 | Brundage ............. G01S 5/0289 370/338 |
| 2011/0068906 | A1* | 3/2011 | Shafer .................. G06K 7/0008 340/10.3 |

OTHER PUBLICATIONS

Constellation CxP 70024 (BASELINE), Constellation Program Human-Systems Integration Requirements, Dec. 15, 2006, pp. 1-310.
Dolev, D., et al., "On the Possibility and Impossibility of Achieving Clock Synchronization", Journal of Computer and System Sciences, 1986, pp. 230-250, vol. 32.
Driscoll, K., et al., "Byzantine Fault Tolerance, from Theory to Reality." Computer Safety, Reliability, and Security. SAFECOMP 2003. Lecture Notes in Computer Science, 2003, vol. 2788. Springer, Berlin, Heidelberg.
Hayhurst, K.J., et al., "A Review of Current and Prospective Factors for Classification of Civil Unmanned Aircraft Systems", Aug. 2014, NASA/TM-2014-218511.
Hayhurst, K. J., et al., "A Case Study for Assured Containment", 2015 International Conference on Unmanned Aircraft Systems (ICUAS), Jun. 2015, pp. 260-269.
Kopetz, H., "Real-Time Systems, Design Principles for Distributed Embedded Applications", 1997, Kluwar Academic Publishers, ISBN 0-7923-9894-7.
Lamport, L. et al., "The Byzantine Generals Problem", ACM Transactions on Programming Languages and Systems, Jul. 1982, 4(3), pp. 382-401.
Malekpour, M.R., "A Self-Stabilizing Synchronization Protocol for Arbitrary Digraphs", The 17th IEEE Pacific Rim International Symposium on Dependable Computing (PRDC 2011). Dec. 2011, pp. 1-10.
Malekpour, M.R., "A Self-Stabilizing Hybrid-Fault Tolerant Synchronization Protocol", 2015 IEEE Aerospace Conference, Mar. 2015, pp. 1-11.
Malekpour. M.R. , "Achieving Agreement in Three Rounds With Bounded-Byzantine Faults", AIAA SciTech 2017, Jan. 2017, pp. 1-10.
Miner, P., et al., "A Unified Fault-Tolerance Protocol", Modeling and Analysis of Timed and Fault-Tolerant Systems, Springer, 2004, pp. 167-182. vol. 3253.
Pease, M., et al., "Reaching Agreement in the Presence of Faults", Journal of the ACM, Apr. 1980, pp. 228-234, vol. 27(2).
Rizos, C. "Locata: A Positioning System for Indoor and Outdoor Applications Where GNSS Does Not Work", Proceedings of the 18th Association of Public Authority Surveyors Conference, 2013, pp. 73-83.
Schmid, U. et al., "Formally Verified Byzantine Agreement in Presence of Link Faults", 22nd International Conference on Distributed Computing Systems (ICDCS'02), Jul. 2002, pp. 1-9.
Srikanth, T.K., et al., "Optimal Clock Synchronization", Journal of the Association for Computing Machinery, Jul. 1987, pp. 626-645, vol. 34(3).
Welch, J.L., et al., "A New Fault-Tolerant Algorithm for Clock Synchronization", Information and Computation, Apr. 1986, pp. 1-36. vol. 77, No. 1.
Website—http://www.gps.gov, "GPS: The Global Positioning System"—last accessed Apr. 20, 2018.

* cited by examiner

SYSTEM AND METHOD TO SYNCHRONIZE CLOCKS ACROSS A DISTRIBUTED NETWORK OF NODES

CROSS-REFERENCE TO RELATED PATENT APPLICATIONS

This patent application claims the benefit of and priority to U.S. Provisional Patent Application No. 62/503,530 filed on May 9, 2017, the entire contents of which are hereby incorporated by reference.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

The Global Positioning System (GPS) is a versatile, generally available worldwide navigational system based on the reception of signals from a network of satellites orbiting the globe. GPS is widely used as an external source for geo-location in 2D and 3D Local Positioning Systems (LPS), e.g., automobile navigation and unmanned aerial vehicles (UAV). The growing reliance upon a single source of positioning information introduces a significant vulnerability. Since GPS is a weak signal, it is vulnerable to jamming. Furthermore, the multitude of satellites forming GPS was intended to provide accurate signals and not necessarily support a degree of fault-tolerance, and so GPS is vulnerable to spoofing (i.e., the purposeful sending of inaccurate data to the receiver). The European Union (Galileo), Russia (GLONASS), China (BeiDou) and other countries have deployed and are in the process of deploying more satellites in order to improve the accuracy and reliability of Global Navigation Satellite Systems (GNSSs). Nevertheless, it has been pointed out that the most severe limitation of GNSS performance will still remain; the accuracy of positioning deteriorates very rapidly when the user receiver loses direct view of the satellites, which typically occurs indoors, or in severely obstructed urban environments, steep terrain and in deep open-cut mines. As a result, LPS are often used in either a complementary or alternative fashion to the satellite systems, especially in areas where GPS signals are sufficiently degraded. Although Long-range LPS, e.g., Decca Navigator System and LORAN (Long Range Navigation), have been used for navigation of ships and aircraft, nowadays, a LPS typically refers to a system with limited range used for outdoor and/or indoor applications.

Positioning systems that consists of a network of three or more signaling beacons have been used for navigation and surveying by providing location information within the coverage area. The reliability and accuracy of such a positioning system fundamentally depends on two factors; first, its timeliness in broadcasting signals, i.e., whether or not the signals are transmitted at the same time or as close to the same time as possible, and second, the knowledge of its geometry, i.e., locations and distances of its beacons. The more accurate the time at each beacon and the higher the precision across the network, the more accurate the estimated position at the receivers. Similarly, the more accurate the geometry and knowledge of the location and distances of the beacons from each other, the more accurate the estimated position at the receivers will be.

Distributed LPSs (DLPS) either synchronize to a common external source like GPS or establish their time synchrony internally. GPS satellites operate on very high precision atomic clocks that "tick" with an accuracy of one nanosecond (providing position accuracy within 5 to 10 meters) and are synchronized to the Coordinated Universal Time (UTC), which is the primary time standard by which the world regulates clocks and time. The atomic clocks on these satellites are very accurate (e.g., drift rate 10-13, or less) and very expensive, thus, cost prohibitive for most applications. LPSs on the other hand operate with lower quality clocks, i.e., have a higher drift rate, that are more affordable. These clocks, however, need to be periodically resynchronized to account for their inherent drift and far more frequently than the atomic clocks.

In DLPSs that use master-slave scheme to internally establish their time synchrony, typically, a particular beacon is designated as the master and other beacons synchronize to it, e.g., the Locata system (Locata Corporation, Canberra, Australian Capital Territory, Australia). Due to its centralized nature, a network with master-slave scheme results in a single point of failure. Another drawback of existing DLPSs is their lack of addressing various fault manifestations, in particular, communication link failures. Firstly, due to the high reliability of modern processors, communication-related failures like receiver overruns (run out of buffers), unrecognized packets (synchronization errors), and CRC errors (data reception problems) in all sorts of wireless networks are increasingly dominating process failures. Secondly, such link failures are typically transient and mobile, in the sense that they typically affect different messages to from different processes over time.

The geo-location and time-synchrony problems have a lot in common. Geo-location requires a distributed system of at least four beacons to estimate the location in 3-dimentions. The fourth beacon is necessary to account for discrepancies in value of time readings, ((x, y, z), t), which is primarily due to low quality of the receiver's local oscillator. Similarly, the time-synchrony problem requires a minimum of four nodes (beacons) to tolerate a malicious faulty behavior. The capability of a distributed network of beacons to autonomously self-synchronize and, subsequently, provide reliable signaling for proper geo-location, at the receivers and independent of GPS, is essential in reducing total reliance on an external source like GPS. The internal timing of an independently self-synchronizing network can readily be realigned to GPS time when it becomes available. Similarly, prior knowledge of the exact locations of the beacons and their network geometry is not necessary; an autonomous distributed fault-tolerant local positioning system should be able to first determine its own geometry and then realign it to the world map when GPS data is available.

Thus, it may be desirable to provide a highly reliable, GPS-independent, fault-tolerant, redundant system for geo-location of UAVs, such as those UAVs used in NASA's Unmanned Aircraft Systems (UAS) Integration in the National Airspace System (NAS) Project and Langley Research Center's CERTAIN (City Environment for Range Testing of Autonomous Integrated Navigation). In addition, it may be desirable to provide a DLPS suitable for high-dynamic systems by accommodating capabilities for UAVs to maneuver at high speed, and in dynamic and mobile environments.

BRIEF SUMMARY OF THE INVENTION

Systems, methods, and devices of the various embodiments may provide for synchronizing clocks across a distributed network of nodes. Various embodiments include an autonomous distributed fault-tolerant local positioning system, a fault-tolerant GPS-independent distributed autonomous distributed local positioning system, for static and/or mobile objects and/or solutions for providing highly-accurate geo-location data for the static and/or mobile objects in dynamic environments. Various embodiments enable faulty Echo message recovery using trilateration from locally time-stamped events obtained from other nodes in a distributed network of nodes. Using the faulty Echo message recovery techniques, in addition to clock synchronization various embodiments may enable object detection and location. Various embodiments may provide a method of synchronizing clocks across a distributed network of nodes including the step of determining a distance between a plurality of nodes in the distributed network of nodes, wherein the plurality of nodes for which the distance between is determined does not include a node associated with an Echo message that is faulty. In this way, the distance between the node associated with the faulty Echo message (i.e., a second node) and other nodes is not determined at this step. Each node in the distributed network of nodes may broadcast an Echo message including a vector of locally time-stamped events (e.g., Init messages) to other nodes in the distributed network of nodes. The method may also include the step of determining a time when the faulty Init message was broadcast. The method may also include the step of determining a time when the faulty Echo message was broadcast using trilateration of temporal values and locations associated with the plurality of nodes. In addition, the method may include broadcasting a recovered Echo message to other nodes in the distributed network of nodes. The recovered Echo message may be based on the determined time when the faulty Echo message was broadcast to other nodes in the distributed network of nodes.

Various embodiment may include the steps of detecting, by a sensor of a node in the distributed network of nodes, an object within a region of the distributed network of nodes, broadcasting, by a transmitter of the node, a message regarding the detected object to other nodes within the distributed network of nodes, determining, by a processor of the node, whether a solution may be calculated as to a time when the object broadcast a received message or emitted a detected signature, determining, by the processor, a value for the time in response to determining the solution may be calculated, and broadcasting, by a transmitter of the node, a location of the object based on the determined value for the time when the object broadcast the received message or emitted the detected signature.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
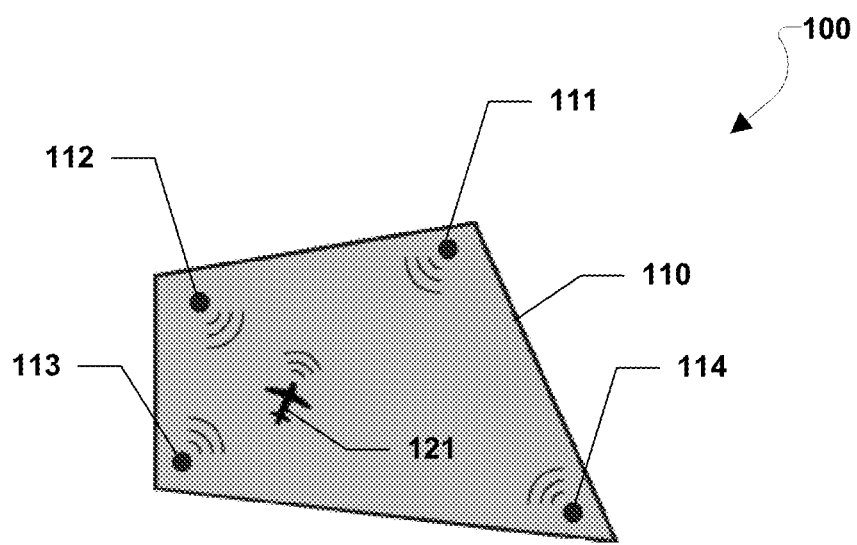
FIG. 1 illustrates an object functioning as an active participant in a network of nodes for locating the object within the network, according to various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the terms "protocol" and "algorithm" are used interchangeably to refer to a method or system of rules governing a process and/or procedure for collectively accomplishing and/or determining something. Also, the terms "node" and "object" are herein used generically and are applicable to various applications. For geo-location applications, however, the terms "node" and "object" generally refer to beacons and vehicle (or target), respectively.

As used herein, the term "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players, smart televisions, digital video recorders (DVRs), and similar electronic devices which include a programmable processor and memory and circuitry for performing the operations described herein.

The word "exemplary" and the abbreviation "e.g." are both used herein to mean "serving as an example, instance, or illustration." Any implementation described herein as "exemplary" is not necessarily to be construed as preferred or advantageous over other implementations.

Various embodiments include an autonomous distributed fault-tolerant local positioning system, a fault-tolerant GPS-independent distributed autonomous distributed local positioning system, for static and/or mobile objects and/or solutions for providing highly-accurate geo-location data for the static and/or mobile objects in dynamic environments. Issues governing a distributed local positioning system are herein disclosed, namely, timeliness of its broadcasting signals and the knowledge of its geometry, i.e., locations and distances of the beacons. Shortcomings of existing distributed positioning systems are addressed in accordance with various embodiments, namely, a single point of failure and lack of addressing various fault manifestations, in particular, communication link failures. Such shortcomings may be addressed by first employing fault-tolerant distributed clock synchronization protocols to achieve the theoretical synchrony of one-clock tick across the distributed system of nodes (beacons) and, consequently, determining the geometry of the network, and then using trilateration to accurately determine the current location of the intended object. Various embodiments include a protocol that is an amalgamation of Primary and Secondary protocols, while eliminating inefficiencies and, at the same time, speeding up the resynchronization process. Some embodiments include a new synchronization protocol entitled "A Fault-Tolerant Clock Synchronization Protocol For Wireless Networks," which is also referred to as the Secondary protocol. Subtleties of integrating the two protocols are herein addressed, which are based on augmenting the geo-location data, and which includes nodes' local times, ((x, y, z), t), for clock synchronization purposes.

In various embodiments, a DLPS is provided that may be able to autonomously and continually establish time-synchrony and determine its geometry independent of an external source. Autonomy may be viewed as distinct from automation. Automated systems provide control or execution of a system without human intervention or commands. This does not preclude the possibility of operator input, but such input is explicitly not required for an automated function.

Various embodiments employ distributed clock synchronization protocols to achieve a theoretical "fine synchrony" of one-clock tick across a distributed system of nodes and, consequently, determine the geometry of the network, and then use trilateration to determine the current location of the intended object. In accordance with various embodiments, fine synchrony may be achieved using two complementary protocols. First, a primary distributed clock synchronization protocol may be used to establish coarse synchrony across the distributed system of nodes. Second, a secondary protocol may be used to achieve fine synchrony, which is a theoretical limit bounded to one clock tick across the system. Trilateration is the process of determining absolute or relative location of a point given a set of sphere centers, their locations, and their radii, using the geometry of circles, spheres or triangles.

Based on fault-tolerance requirements and in accordance with various embodiments, a processor may employ one of two mechanically verified distributed clock synchronization protocols to establish coarse synchrony across the nodes of a distributed network. For example, the Digraph protocol (see, Malekpour, M. R., "*A Self-Stabilizing Synchronization Protocol For Arbitrary Digraphs,*" The 17th IEEE Pacific Rim International Symposium on Dependable Computing (PRDC 2011), pp. 10, December 2011) may handle detectable faults and are versatile, in terms of the variety of topologies to which they are applicable, and the symmetric fault-tolerant protocols which, as the name implies, tolerate symmetric faults. A fault is symmetric when all good nodes observe consistent error manifestations, but do not know that a particular node is bad. These protocols guarantee synchrony, with an initial precision of f($\gamma$), where $\gamma$ is the maximum communication delay between any two nodes, across a distributed system of nodes, from a random start and in the presence of their representative fault types. Since $\gamma$ can be greater than one clock tick, this may achieve coarse synchrony. Once coarse synchrony is achieved, a secondary protocol may subsequently attain a fine synchrony among the nodes having a theoretical precision of one clock tick. Once the fine synchrony among the nodes is achieved, geometry of the network may be determined, and location of an object may be estimated, at the object and/or at the nodes, using trilateration.

More than one type of fault (i.e., fault models) may be considered in a communication system. A distributed system may be referred to as "synchronous" if there is a known upper bound on the transmission delay of messages and if there is a known upper bound on the processing time of a piece of code. In synchronous message-based distributed systems, a fault may be typically defined as a message that was not transmitted when it was expected, a message that was transmitted but not received, or received but not accepted, i.e., deemed invalid by a receiver. Consequently, there may be two viewpoints, namely a node-fault model and a link-fault model.

In the node fault model, faults may be associated with a source node of the message and all fault manifestations between the source and the destination nodes for the messages from that source may count as a single fault. The node-fault model is often associated with an arbitrary faulty node. In the node-fault model, all links may be assumed to be good. The node-fault model may even be used to model the absence of a link. Thus, using the node-fault model a link fault may be modeled as a failure of a source node.

In the link-fault model, a fault may be associated with the communication means connecting the source node to the destination node. In this model, all nodes are assumed to be good and an invalid message at the receiving node is counted as a single fault for the corresponding input link. Thus, from the global perspective, a Byzantine (arbitrary) faulty node may manifest as one or more link failures. At least one link-fault model is called a perception-based hybrid fault model, in which faults are viewed from the perspective of the receiving nodes. In this way, faults are associated with their input links, and all nodes are assumed to be good. In the perception-based hybrid fault model, since F faulty nodes can produce at most F faulty perceptions in any node, the link-fault model is compatible with the traditional node-fault model and so, all existing lower bound and impossibility results may remain valid.

Various embodiments consider the node-fault model, where a node is detectable faulty, symmetric faulty, or Byzantine (arbitrary) faulty, provided the fault manifests itself to at most F other nodes, or experiences no more than F faults if it is a good node, where F≥0. To tolerate sporadic link failures, various embodiments may also employ the link-fault model, which may assume all nodes are good and, at any round, no more than F link faults are perceived at a receiving good node. In both types of fault models, the maximum number of simultaneous faults in the network may be limited to F.

Various embodiments may include synchronous message-passing wireless distributed systems and model the system as a graph with a set of nodes (vertices) that communicate with each other by sending messages via a set of wireless communication links (edges) that represent the nodes' interconnectivity. The underlying topology may be considered to be a fully connected network of K nodes that exchange messages through a set of wireless communication links. In accordance with various embodiments, the system may consist of a set of good nodes and a set of faulty nodes. A good node may be assumed to be an active participant and may correctly execute protocols. In contrast, a faulty node may be considered either benign (detectably bad), symmetric, or bounded-arbitrary (Byzantine) faulty.

A fully connected graph of K nodes may consist of K(K−1) unidirectional links. A good link between any two nodes may be assumed to correctly deliver a message from its source node to its destination node within a bounded communication delay time. A faulty link does not deliver the message, delivers a corrupted message, or delivers a message outside the expected communication delay time. The communication means is wireless broadcast, i.e., one-to-many, with each node broadcasting on a separate and dedicated channel.

Broadcast of a message by a node may be realized by transmitting the message, at the same time, to all nodes. The communication network may not guarantee any relative order of arrival of a broadcast message at the receiving nodes, that is, a consistent delivery order of a set of messages does not necessarily reflect the temporal or causal order of the message transmissions. Various embodiments assume $F<K/3$ and define the minimum number of good nodes in the system, G, by $G>2K/3$ nodes. For the node-fault model, the minimum number of nodes needed to maintain synchrony is well established to be $3F+1$.

The communication delay between the nodes is herein expressed in terms of the minimum event-response delay, D, and network imprecision, d. These parameters are measured at the network level. A message broadcast by a node at real time t is expected to arrive at all other nodes, be processed, and subsequent messages generated by those nodes within the time interval [t+D, t+D+d]. Communication between independently-clocked nodes is inherently imprecise. The network imprecision, d, is the maximum time difference among all receivers of a message from a transmitting node with respect to real time. The imprecision may be due to many factors including, but not limited to, the drift of the oscillators with respect to real time, hence, variation in processing time, jitter, discretization error, temperature effects and especially differences in the distances between the nodes, i.e., the lengths of the links, which is a more prevalent factor in wireless communication. These parameters may be assumed to be bounded, $D>0$, $d\geq 0$, and may both have units of real-time clock ticks and their values known in the network. The communication delay, denoted $\gamma$, is expressed in terms of D and d, is defined as $\gamma=D+d$, and has units of real-time clock ticks. In other words, various embodiments assume synchronous communication and bound the communication delay between any two nodes by $[D, \gamma]$.

In order to achieve and maintain desired synchrony, the nodes communicate by exchanging what are herein referred to as "Sync" messages, where synchrony is defined as a measure of the relative imprecision of the values of the local clocks of the good nodes, which is protocol dependent and typically a multiple of $\gamma$. A formal definition of synchrony may be provided, as described below, for the methods and systems herein. A Sync message from a given source is valid if it arrives at or after one D of an immediately preceding Sync message from that source, that is, the message validity in the value domain, i.e., valid Sync messages are rate-constrained. Assuming physical-layer error detection is dealt with separately, the reception of a Sync message is indicative of its validity in the value and time domains. A node assumes its own message to be valid locally $\gamma$ clock ticks since it was broadcast.

There exist a family of mechanically verified clock synchronization protocols that address different types of faults. Such clock synchronization protocols use a strategy to tolerate Byzantine faults indirectly by first converting a Byzantine fault to a symmetric fault. For example, the 3ROM algorithm does this conversion in three communication rounds, and then uses a symmetric-fault-tolerant protocol to synchronize the system of K nodes, where $F<K/3$. Various embodiments use a symmetric-fault-tolerant protocol, which is herein referred to as the Primary protocol.

If the types of faults to be tolerated are assumed to be a detectable type, a Digraph protocol is more suitable since it is more versatile and readily applies to any static and/or dynamic topology. But since detectable faults are a subset of symmetric faults, the symmetric-fault-tolerant protocol in accordance with various embodiments and as presented below is also capable of addressing detectable faults. Thus far, mechanical verification of this protocol has been limited to fully connected graphs.

Various embodiments use several assumptions for implementing the Primary protocol, as follows: (1) the topology is a fully connected graph; (2) F is the maximum number of symmetric faults in the network; (3) the number of nodes constituting the network is K, where, for a node-fault model, $F<K/3$ nodes; (4) the bound on the oscillator drift rate is $\rho$, where $0\leq\rho\ll 1$; (5) a message sent by a node will be received and processed by the destination nodes within $\gamma$, where $\gamma=(D+d)$; and (6) physical-layer error detection is dealt with separately, thus, the reception of a Sync message is indicative of its validity in value and time domains.

In accordance with various embodiments, a node may comprise a synchronizer and a set of monitors. To assess the behavior of other nodes, each node may employ as many monitors as the number of nodes that are directly connected to it, with one monitor for each source of incoming message. A monitor keeps track of the activities of its corresponding source node. A valid Sync message is conveyed to the local synchronizer. The assessment results of the monitored nodes are then utilized by the synchronizer in the synchronization process. A monitor disposes of the valid message after its life-span expires.

TABLE 1

The protocol functions.

ValidateMessage( ):
  if (incoming message = Sync) and (MessageTimer
    ≥ D) MessageValid = true,         // store it,
    MessageTimer = 0,
  elseif (MessageTimer ≥ MessageLifeSpan)
    MessageValid = false,         // it expired
  elseif (MessageTimer < MessageLifeSpan)
    MessageTimer = MessageTimer + 1.
Accept( ):
  if (number of stored Sync messages ≥ $T_A$)
    return true,
  else
    return false.

Table 1 shows the function titled ValidateMessage( ), which may be used by the monitors to determine whether a received Sync message meets the minimum timing requirement, and thus is valid in both value and time domains, and whether a stored valid Sync message has reached its lifespan and expired. The function titled Accept( ), used by the synchronizer, examines availability of sufficient valid Sync messages. The sufficiency of available, valid messages, denoted by $T_A$, is a function of the type and number of faults tolerated. For tolerating $F_S$ simultaneous symmetric faults, $T_A\geq K/2$. When a sufficient number of messages have been received, the Accept( ) function returns a Boolean value of true.

Due to inherent drift in local oscillators in the nodes, their clocks are bound to drift apart resulting in gradual degradation of synchrony. As a result, the nodes have to periodically resynchronize, which is herein referred to as the "resynchronization process." The resynchronization process may begin when the first good node times out and transmits a Sync message and may end after an accept event (as defined in the protocol) occurs in every good node. Upon start of a new round of the resynchronization process, a node continually sends out Sync messages, once per γ, to other nodes that are connected to it. Consequently, the life-span of a Sync message at the receiving nodes is set to be γ. The protocol, executed by all good nodes, is presented in Table 2, below, and consists of a synchronizer and a set of monitors that execute once every local clock tick. Four concurrent if statements collectively describe the synchronizer. These statements are labeled ST (StateTimer), LT (LocalTimer), TS (Transmit Sync), and TT (TransmitTimer). The function titled ValidateMessage( ) describes the monitor.

TABLE 2

The symmetric-fault-tolerant protocol.

Synchronizer:
ST1: if (StateTimer < 0) or (Accept( ))
    StateTimer := 0, // reset
ST2: elseif (StateTimer < $P_{ST}$)
    StateTimer := StateTimer + 1.
LT1: if (LocalTimer < 0) or
    (LocalTimer ≥$P_{LT}$) or
      (StateTimer = [$\pi_{init}$])
    LocalTimer := 0,  // reset
LT2: else
    LocalTimer := LocalTimer + 1.
TT1: if (TransmitTimer < 0) or
    (TransmitTimer ≥ γ) and
      (StateTimer ≥$P_{ST}$))
    TransmitTimer := 0,
TT1: elseif (TransmitTimer < γ)
    TransmitTimer := TransmitTimer + 1.
TS1: if (StateTimer ≥$P_{ST}$) and // timed out
    (TransmitTimer ≥ γ) and
      (not Accept( ))
    Transmit Sync.
Monitor:
    ValidateMessage( ).

The following symbols and self-stabilization properties are used in the symmetric-fault-tolerant protocol: $P_{LT}$ has units of real time clock ticks; and is defined as the upper bound on the time interval between any two consecutive resets of the LocalTimer by a node, $P_{LT}>>0$; $P_{ST}$ has units of real time clock ticks; and is defined as the upper bound on the time interval between any two consecutive resets of the StateTimer by a node, $P_{ST}>>0$; $\Delta_{Net}(t)$, for real time t, is the maximum difference of values of the LocalTimers of any two nodes (i.e., the relative clock skew) for t≥$t_0$; π, the synchronization precision, is the guaranteed upper bound on $\Delta_{Net}(t)$ for all t≥C, 0≤π<<$P_{LT}$; and C, the convergence time, is defined as the bound on the maximum time for the network to achieve the guaranteed precision π.

A distributed system may be defined to be self-stabilizing if, from an arbitrary initial state, it is guaranteed to reach a legitimate state in a finite amount of time and remain in a legitimate state. For clock synchronization, a legitimate state is a state where all parts in the system are in synchrony which is formally defined below. To prove that a protocol is self-stabilizing (self-synchronizing), it suffices to show that the following self-stabilization properties hold: Convergence—$\Delta_{Net}(C) \leq \pi$, 0≤π<<$P_{LT}$; Closure—For all t≥C, $\Delta_{Net}(t) \leq \pi$; Congruence—For all nodes Ni, for all t≥C, (Ni.LocalTimer(t)≤[π])→Net(t)≤π; and Liveness—For all t≥C, good node $N_i$, i=1 . . . K, there exists ($P_{ST}-\pi-\gamma$)≤U≤$P_{ST}$, such that $N_i$.LocalTimer(t+1)=mod($N_i$.LocalTimer(t)+1, U).

In various embodiments, C=$P_{LT}$+ResetLocalTimerAt+2γ, where ResetLocalTimerAt is a time when the LocalTimer is reset and various embodiments chose [$\pi_{init}$] as the earliest time when all good nodes have completed the resynchronization process. Since 0<γ<<$P_{ST}$<$P_{LT}$, and the LocalTimer is reset after reaching $P_{LT}$ (worst-case wraparound), a trivial solution is not possible.

The presented methods and systems provide a guaranteed initial precision of $\pi_{init}$=d+γ+δ(d+γ)<2γ clock ticks, which is referred to herein as "coarse synchrony." Hereafter, this guaranteed initial precision is referred to as the Primary clock synchronization protocol, or simply the Primary protocol. A Secondary clock synchronization protocol is described below that achieves the theoretical precision of one clock tick (i.e., fine synchrony).

The Convergence and Closure properties address achieving and maintaining network synchrony, respectively. As defined above, given sufficient time, C, the convergence property examines whether or not the system has reached a point where all nodes are within the specified precision. The closure property, on the other hand, examines whether or not the system starting within the specified precision will remain within that precision thereafter. The convergence and closure properties provide an external view of the system, whereby the external viewer can examine whether or not the system has self-stabilized.

In safety-critical time division multiple access (TDMA) architectures, synchronization is a crucial element of such systems. More precisely, TDMA-type applications are based on the fundamental assumption of the existence of initial synchrony. The protocol used in accordance with various embodiments is meant to provide this fundamental requirement of TDMA-type applications to higher-level protocols. One of the challenges in employing multiple protocols in a distributed system has been the integration of these protocols operating at different levels of application. Previously, the integration of a lower-level protocol with higher-levels either has not been addressed or had simply been overlooked. The Congruence property, therefore, addresses this requirement. Unlike the convergence and closure properties that provide system view from the perspective of an external viewer, the Congruence property provides a local view from the perspective of a node by providing the necessary and sufficient conditions for the node to locally determine whether or not the system has converged. The Congruence property, therefore, is used in the integration of this underlying self-stabilization protocol with higher-level protocols in the system.

The Liveness property examines whether or not a node takes on all possible discrete values within an expected range. In other words, the system is considered "alive" when the good nodes execute the protocol properly, and time advances within each node.

The Secondary protocol achieves fine synchrony, i.e., the theoretical precision of one clock tick across a distributed network of K nodes. Various embodiments do not assume prior knowledge of the location of each node or the distances between any two nodes. Various embodiments may assume the following for implementing the secondary protocol: (1) the topology is a fully connected graph; (2) F is the maximum number of asymmetric (Byzantine) faults in the network; (3) the number of nodes constituting the network is K, where, for node-fault model, F<K/3 nodes; (4) the bound on the oscillator drift rate is p, where 0≤ρ<<1; (5) known maximum communication delay between any two nodes, γ≥(D+d); (6) coarse initial synchrony with $\pi_{init}$≤2γ clock ticks; (7) unique identifier (ID) for each node and nodes are ordered counter clockwise, looking down from high above and assuming nodes not to be in the same plane as the reference point; (8) each node broadcasts its messages on a separate channel; and (9) physical-layer error detection is dealt with separately, thus, the reception of a Sync message is indicative of its validity in value and time domains.

In accordance with various embodiments, the Secondary protocol may be executed by all nodes $N_i$, for all i, every clock tick. This Secondary protocol is based on the assumption of initial coarse synchrony ($\pi_{init} \leq P_{LT}$). To maintain consistency with terminologies used in the literature, as used herein the terms "Init" and "Echo" are used to refer to messages. The Echo message, as referred to herein, is a vector of locally time-stamped events. Various contemporary algorithms achieve optimum synchrony in multiple rounds of iterations while various embodiments may achieve optimum synchrony in only one iteration. Furthermore, although not explicitly stated, those contemporary algorithms assume a fully connected graph with a traditional node-fault model and are not necessarily tailored for wireless communications. The methods and systems of the various embodiments are designed with wireless communications in mind. In this way, various embodiments may accommodate for larger variation in the communication latencies among the nodes than contemporary algorithms tailored for wired networks. In addition, various embodiments may apply equally to both wireless and wired networks.

Table 3, below, shows a fault-tolerant clock synchronization protocol for wireless networks that is referred to herein as the Secondary protocol. The Secondary protocol starts executing when prompted by the Primary protocol, in response to the Congruence property indicating that the network is in synchrony, albeit, coarse synchrony. Assertion of the Congruence property also resets a local state of each node in preparation for the Secondary protocol. Conversely, execution of the Secondary protocol may be halted when the Congruence property no longer holds. In Table 3, the following are assumed: (1) $\omega = \pi_{init} + \gamma$; (2) $\psi$ = ResetLocalTimerAt; (3) Init, is a message broadcast by a node to all others; and (4) Echo, is a message broadcast by a node to all others and is a vector of K entries of time-stamped events indicative of arrival times of the Init messages. A node assumes its own messages (Init and Echo) to be valid γ clock ticks after it broadcasts them. Similar validity measures (given the expected time intervals) for the Init and Echo messages may be assumed as was done for the Sync message.

TABLE 3

A Fault-Tolerant Clock Synchronization Protocol for Wireless Networks.

| | |
|---|---|
| BI: | if (LocalTimer = $\psi$) Broadcast Init |
| BE: | if (LocalTimer = $\omega$ + $\psi$) Broadcast Echo |
| RCA: | if (LocalTimer = 2$\omega$ + $\psi$) Recover( ), Adjust( ) |

In accordance with various embodiments, Recovery( ) and Adjust( ) functions are included in the Secondary protocol. The Secondary protocol uses values associated with nodes in the system. At any node $N_x$, a matrix M of information may be stored regarding received messages, where a row i is a vector of locally time-stamped values received from node $N_i$ (content of received Echo message from $N_i$) and a column j is the vector of reportedly received values from $N_j$, i.e., M(i, j) is the time when $N_i$ is reported to have received a message from $N_j$. Let T be a matrix of time-differences between nodes $N_i$ and $N_j$.

$$T(i,j) = (M(i,j) - M(j,i))/2 \qquad (1)$$

Thus, matrices M and T have the same dimensions. In evaluating Equation 1, T(i,j) is invalid if the right hand side of the equation contains an invalid value. It follows from Equation 1 that T is skew-symmetric and an invalid entry in M (e.g., M(i,j) will result in two invalid entries in T, T(i,j) and T(j,i).

The distance between any two nodes $N_i$ and $N_j$ is the average of the time of received messages exchanged between the two nodes multiplied by the speed of light, C, and is determined by equation, below. The distance is unknown if the right-hand side contains an invalid value.

$$D_{ij} = C(M(i,j) + M(j,i))/2 \qquad (2)$$

The Recovery( ) function may comprise two parts, namely recovering invalid Init and recovering invalid, or missing, Echo messages (i.e., "faulty Echo messages").

As discussed earlier, synchrony is a prerequisite in using trilateration for determining the location and, consequently, distances to an intended object. Matrix T is introduced to aid with the recovery of missing data, provide fault-tolerance, and achieving fine synchrony given initial contents of matrix M. Once faults are recovered, fine synchrony may be achieved and the contents of matrix M may be restored.

A fault may be defined as no message or an invalid received message. Thus, a faulty/no Init message manifests as an invalid entry in matrix M. As long as the fault assumptions are not violated, recovery of an invalid Init is possible by using valid data received by other nodes. In particular, a fault between nodes $N_i$ and $N_j$ can be recovered as long as there is valid data between these nodes and a third node, such as node $N_x$.

$$T(i,j) = T(i,x) - T(x,j) \qquad (3)$$

A missing entry in M(i,j) may be considered synonymous with a link fault. Having T(i,j) and either M(i,j) or M(j,i), missing M(j,i) or M(i,j) may be reconstructed by using Equation 1.

As mentioned earlier, after the network has reached fine synchrony, $D_{ij}$ may be determined using trilateration and data in M, provided there is sufficient data in M. Using Equation 4, below, derived from Equations 1 and 2, M(i,f), and subsequently M(f,i), may be recovered. In case of marginally sufficient data, where two possible solutions exist, the assumption of an ordered network may lend itself to determining the correct solution.

$$M(i,j) = T(i,j) + D_{ij} \qquad (4)$$

It also follows from Equation 3 that if a node is silent and does not broadcast Init and Echo messages that it cannot be recovered. On the other hand, if a node broadcasts an Init message to at least three good nodes, but does not broadcast an Echo message, it may be recovered.

A faulty Echo message may manifest as an invalid row in matrix M. Consider that at $N_i$, $N_f$ may be the faulty node whose corresponding row in M contains no data. Let V be a vector of data associated with all nodes that received valid Init messages from $N_f$, i.e., V is in the column f in M and V=M(i,f)=valid. The following iterative process may be used to recover from this fault and restores invalid row f of M, provided the fault assumptions are not violated, i.e., there exist sufficient valid entries in V. The number of iteration is captured by w. Step 1, determine $D_{ij}$ using Equation 2, for all i, j, $N_i \neq N_f$ and $N_j \neq N_f$ and reset iteration counter w. Step 2, realign all nodes in V, around node $N_j$ from the set of nodes whose values constitute the vector V, excluding $N_f$, by adjusting the content of the vector V. Although typically a node uses itself as reference, an optimum reference for alignment would be choosing the node whose value is at the midpoint of the values in V.

$$V(i)=M(i,f)+T(j,i), \text{ for all } i \quad (5)$$

Step 3, use trilateration with entries in V—modulo the faulty node's—and the location of those nodes relative to each other, i.e., $D_{ij}$, to determine the time when $N_f$ had broadcast its message. Repeat this process until one of the following conditions a or b, below is satisfied. Otherwise, adjust V by some amount $0<x<\gamma$ and continue, where x is a fraction/multiple of clock ticks.

$$V(j)=V(j)-x, \text{ for all } j \quad (6)$$

Increment iteration counter w. Case "a": If trilateration (using the values in V) results in a closest intersecting point, where any two intersecting points are within $\delta \geq 0$ of each other, a solution exists. The amount of imprecision, $0 \leq \delta \ll \gamma$, is due to drift and noise. Case "b": If trilateration does not converge to a closest intersecting point after $w \geq \pi_{init}/x$ iterations, there does not exist a solution. Step 4, if there exists a solution, the intersecting point is indicative of the time when $N_f$ had broadcast its Echo message and xw is the amount of time it took to reach the convergence point. Reconstruct T(i,f) as follows: T(j,f)=xw, where $N_j$ is the reference node used in Step 2; T(i,f)=T(j,f)−T(j,i), for all i and i≠j; and T(f,i)=−T(i,f), to preserve symmetry in T. Then repair M using T and Equation 1 and M(f,i)=M(i,f)−2T(i,f), for all i. Finally, find the remaining distances $D_{ij}$ between all nodes using Equation 2.

Having measured the distances between any two nodes, and since the node IDs are assumed to be ordered, the geometry of the network of nodes in 3-dimentions is uniquely determined if the projection of the nodes onto the x-plane (ground) maintains their ID order.

The Adjust( ) function may be used to adjust the local time of the nodes to a reference point in time and, thus, establish an optimum synchrony across the network. Part of the process involves constructing a timeline of transmission times of Init messages of all nodes using a given row of the matrix T (typically a node uses own row). Although the reference point in time may be anywhere on the timeline, to tolerate F faults, given the above-noted assumptions hold, F values may be discarded from both extremes and a midpoint value (i.e., a transmission time) selected as the reference point from between the remaining values. The process of choosing the reference point should be consistent at all nodes. Thus, letting LT and RT be the left and right most transmission times, respectively, of the remaining nodes on the timeline (after discarding F values from both extremes), then the reference point may be expressed as follows:

$$t_{MidPoint}=(RT+LT)/2 \quad (7)$$

The adjustment amount may be determined by the following equations that may then be incorporated into the node's local timer:

$$\text{Adj}(RT+LT)/2 = t_{MidPoint} \quad (8)$$

$$\text{LocalTimer}=\text{LocalTimer}-\text{Adj} \quad (9)$$

Thereafter, the network precision may be considered "synchronized" to within the theoretical bound of one clock tick. A synchronized system may be used to locate an object.

According to various embodiments, assuming a network of synchronized nodes, an object may be accurately located based on its capabilities and the extent of its interactions with the nodes.

Figure 2:
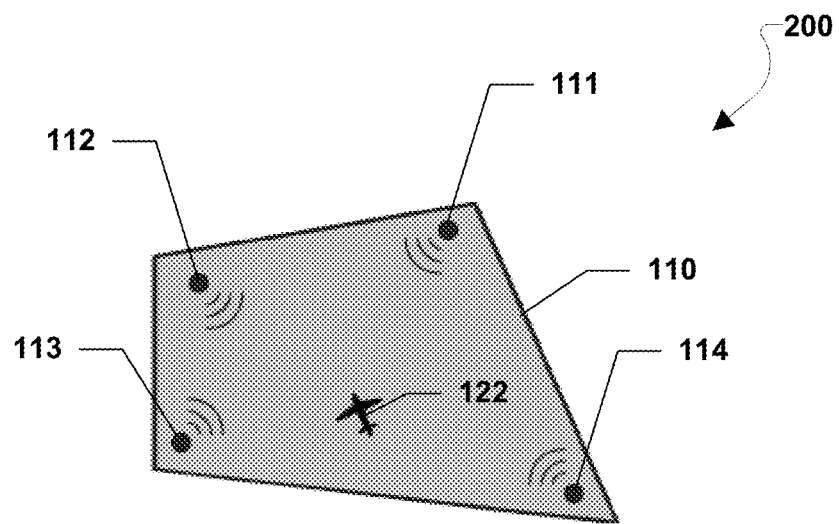
FIG. 2 an object functioning as a passive participant in a network of nodes for locating the object within the network, according to various embodiments.

FIGS. 1 and 2 are schematic illustrations of a network of nodes communicating across an area 110 in accordance with various embodiments. The area 110 may represent a parcel of land or other region of property, such as a section of a farm for a crop-dusting application. In this regard, four scenarios for locating an object are herein considered:

(1) Active Participant—If an object has similar capabilities to the nodes and participates in the synchronization process, that object may determine its own location from the exchanged messages (e.g., object 121 in FIG. 1);

(2) Passive Participant—If the object has similar but fewer capabilities to the nodes, where it receives all exchanged messages between the nodes but does not participate in the synchronization process, i.e., it is a passive participant, it determines its own location from the exchanged messages between the nodes (e.g., object 122 in FIG. 2);

(3) DLPS—Analogous to GPS satellites, the nodes periodically broadcast their locations and times, ((x, y, z), t), and the object determines its location from the received data (e.g., object 122 in FIG. 2); and (4) DLPS Radar—The object periodically broadcasts a signal or emits a signature whereby it is identified by the nodes, its location is accurately determined by the nodes (as described in the following section), and the nodes broadcast the object's location, ((x, y, z), t), back to the object. The object determines its own location with a simple vote (or any other method of combining data), which is a drastic reduction in on-board processing requirement of the received data from multiple nodes (e.g., object 121 in FIG. 1).

FIG. 1 illustrates an active object 121 in the area 110, which contains four nodes 111, 112, 113, 114. The active object 121 may function as an active participant in the network nodes. In contrast, while FIG. 2 illustrates the same area 110 and four nodes 111, 112, 113, 114, FIG. 2 includes a passive object 122. The passive object 122 may function as a passive participant to the network of nodes. In practice, the third and fourth scenarios (DLPS and DLPS Radar) may be implemented even if the object's capability to communicate is limited to one receiver (i.e., unable to transmit messages). The nodes broadcast their data using a TDMA schedule on a single communication channel, thus, preventing interference when communicating with the object.

Figure 3:
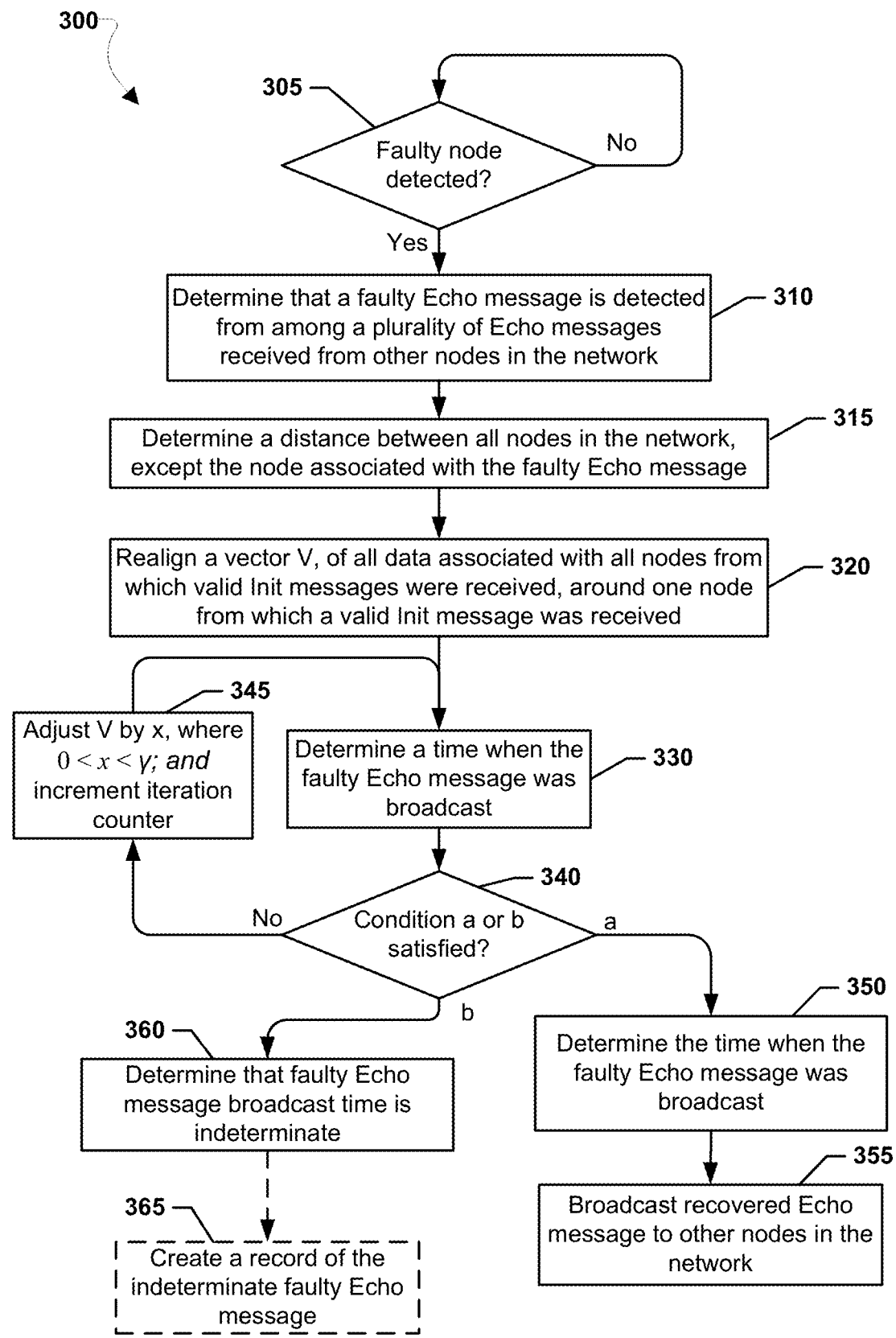
FIG. 3 illustrates a process flow of a method for synchronizing clocks across a distributed network of nodes, in accordance with various embodiments.

Various embodiments may synchronize clocks across a distributed network of nodes. In particular, FIG. 3 illustrates a method 300 for synchronizing clocks across a distributed network of nodes (e.g. nodes 111, 112, 113, 114). The method 300 may be performed by one or more components of a node, such as a processing device, processor, monitor, synchronizer, receiver, and/or transmitter.

An aspect of synchronizing clocks relates to ensuring that no Echo messages are missing and that all the Echo messages are valid (i.e., no faulty Echo messages). As noted above, a missing or invalid Echo message (referred to herein as a "faulty Echo message") associated with a node of the distributed network of nodes may manifest as an invalid row in the matrix M. Rather than always requiring the node associated with that faulty Echo message to retransmit an Echo message, which may use valuable network resources, various embodiments may recover such faulty Echo messages using information about the network that is already available. The method 300 may be used to recover a faulty Echo message. The method 300 may be performed by a processor, such as a processor within a node or a component thereof (e.g., the monitor and/or the synchronizer) in a distributed network of nodes (e.g. 111, 112, 113, 114), to recover faulty Echo messages.

In determination block 305, a monitor of a node in the distributed network of nodes may determine whether a faulty Echo message is detected. The node may include a plurality of other monitors, each configured to receive Echo messages from a designated other node in the distributed network of nodes. Various embodiments attempt to recover faulty Echo messages once detected. In response to the monitor of the node not detecting a faulty echo message (i.e., determination block 305="No"), the monitor may continue checking for faulty echo messages in determination block 305. The monitor may continue checking continuously, at regular or scheduled intervals, or based on other criteria. In response to the monitor of the node detecting a faulty echo message (i.e., determination block 305="Yes"), a processor of the node may determine that an Echo message is faulty in block 310.

In block 310, the processor may receive an indication of the faulty Echo message from the monitor and/or the processor may poll the monitor for a faulty Echo message.

In block 315, the processor may determine a distance $D_{ij}$ between all nodes in the network except the node $N_f$ associated with the faulty Echo message. The distances $D_{ij}$ may be determined using Equation 2.

In block 320, the processor may realign a vector V, of all data associated with all nodes from which valid Init messages were received, around one node $N_j$ from which a valid Init messages was received. Preferably, the node $N_j$ is a node whose value is at the midpoint of the values in the vector V. The realignment in block 320 may be performed by adjusting the content of the vector V using Equation 5.

In block 330, the processor may attempt to determine the time when the node associated with the faulty Echo message broadcast the faulty Echo message. This determination in block 330 may be performed using trilateration with the entries in the vector V and the locations of those nodes relative to one another determined in block 315.

In determination block 340, the processor may determine whether conditions "a" or "b" are satisfied. As described above, condition "a" is satisfied when trilateration, using the values in V, results in a closest intersecting point, where any two intersecting points (i.e., temporal values) are within an amount of imprecision δ of each other (i.e., a solution is determined), where δ≥0. When any two intersecting points are less than or equal to δ from one another, they are said to converge, which means the difference between any two values in V is within δ, 0≤δ<<γ, and so a solution exists. As also described above, condition "b" is satisfied when trilateration does not converge to a closest intersecting point after w≥$π_{init}$/x iterations (i.e., no solution exists). If the closest intersecting points do not converge after w≥γ/x iterations, there does not exist a solution.

The processor may repeat the process in determination block 330, adjusting the value of V with each iteration until either condition "a" or "b" are satisfied. In this way, in response to the processor determining that neither conditions "a" or "b" are satisfied (i.e., determination block 340="No"), the processor may adjust the value of V by a predetermined amount x (e.g., V(i)=V(i)−x, for all i) and increment the iteration counter w in block 345, and then return to block 330 to once again determine a time, when the node associated with the faulty Echo message had broadcast the faulty Echo message, using the adjusted value of V. The predetermined amount x may be a value between zero and the maximum communication delay γ. Thus, x may be a fraction or multiple of clock ticks.

In response to the processor determining that condition "a" is satisfied (i.e., there is a solution; determination block 340="a"), the processor may determine a time when the faulty Echo message was broadcast in block 350. The processor may equate the intersecting point with the time when the object had broadcast its Echo message, xw is the amount of time it took to reach the convergence point, and the current content of V holds the broadcast time of the object's message. Since the proper timing of the object data is reflected in the current value of V, T may be reconstructed and consequently M may be repaired. The distances between the nodes and the object may be readily computed and the location of the object determined using Equation 2. Since the timing values in V are optimum, this localization step does not require further iterations.

In block 355, the processor may broadcast a recovered Echo message to the other nodes in the network in order to synchronize clocks across the distributed network of nodes. The recovered Echo message may be based on the determined time when the faulty Echo message was determined, in block 350, to have been broadcast.

In response to the processor determining that condition "b" is satisfied (i.e., there is no solution; determination block 340="b"), the processor may determine, in block 360, that the faulty Echo message broadcast time is indeterminate. Once the processor determines the faulty Echo message is indeterminate, the processor may cease the Echo message recovery process of the method 300 for the particular faulty Echo message detected in block 305.

Optionally, in optional block 365, the processor may create a record of the indeterminate faulty Echo message, such as in a register. The record may indicate that the invalid Echo message has been detected, including information regarding the node $N_f$ associated with the faulty Echo message. For example, the record of the indeterminate faulty Echo message may be registered by a synchronizer of the node.

In some embodiments, the processor may repeat the operations of the method 300 to attempt to recover another invalid Echo message. For example, the processor may repeat the operations of the method 300 continuously or until a predetermined number of invalid Echo messages are received. Thereafter, the processor may optionally repeat the operations of the method 300 at regular intervals or at other times established for doing so.

Given a set of connected and synchronized nodes with appropriate sensors, and given an object periodically broadcasting a signal or emitting a signature (whereby it is identified by the nodes), the nodes can detect the presence, distance, location, and, subsequently, determine the trajectory of the object properly and accurately and, thus, constitutes a PAssive Distributed Detection And Ranging system (PADIDAR). In this context, PADIDAR is a one-way ranging system. We define PADIDAR as R=f(Sensor, Object). Table 4, below, lists some examples of Sensor-Object pairs.

TABLE 4

Examples of Sensors and Objects.

| Sensor | Object | Intent |
|---|---|---|
| Sound/Noise | Bullet, Missile, UAV, Ball (tennis, football, etc.) | Location, Projection |

TABLE 4-continued

Examples of Sensors and Objects.

| Sensor | Object | Intent |
|---|---|---|
| Vision/Light/Heat Wave/Vibration | UAV, Missile, Meteor Water, Light | Location, Projection Locating earthquake epicenter |

As used herein, a "radar" may be a system for detecting the presence, direction, distance, and speed of aircraft, ships, and other objects, by sending out pulses of high-frequency electromagnetic waves that are reflected off the object back to the source." As used herein, such a system is considered an active radar. In contrast, similar functionality may be achieved by a set of sensors at the nodes that are tailored to the object's signature or a signal broadcast by the object, which is herein referred to as passive radar.

Figure 4:
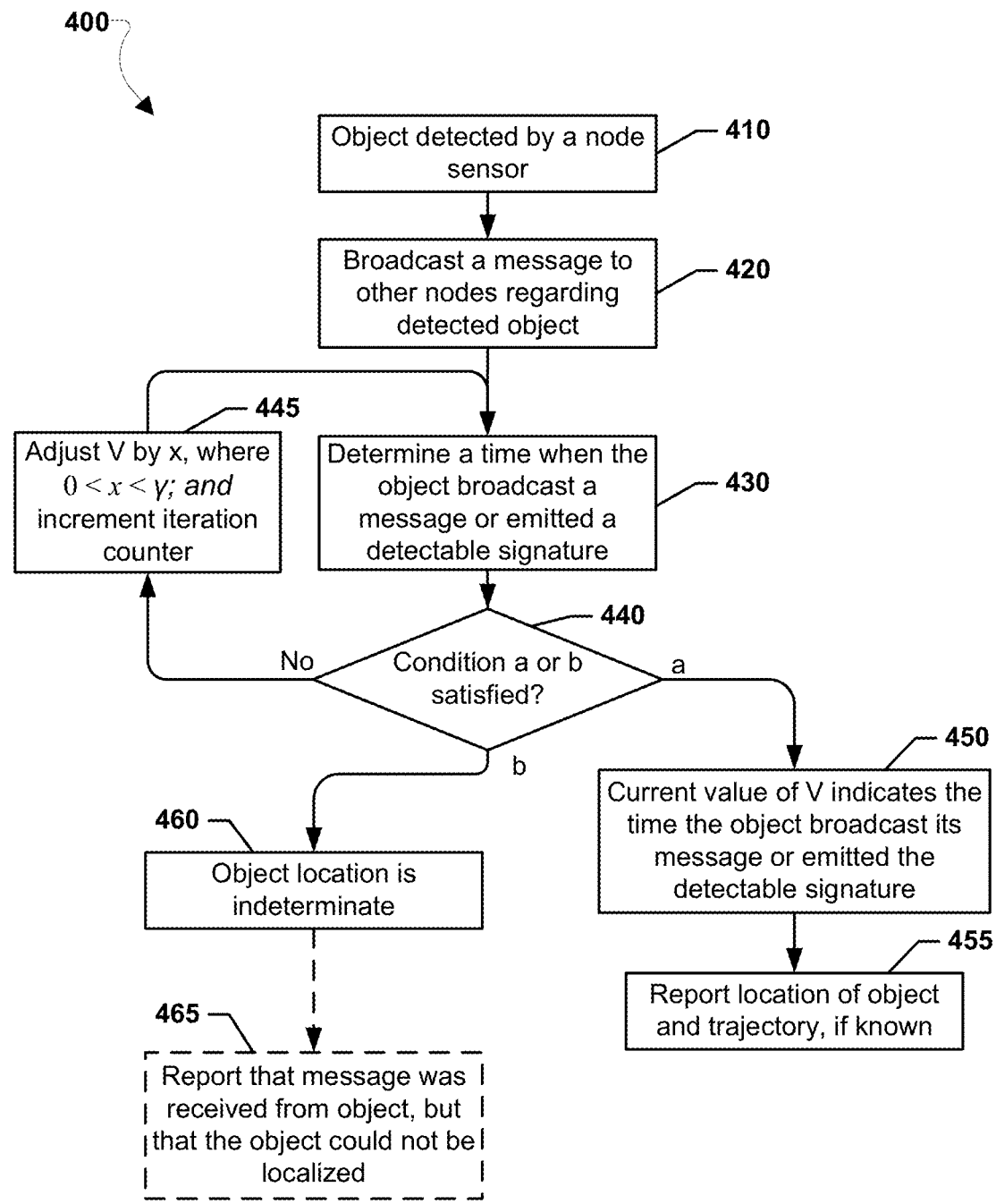
FIG. 4 illustrates a process flow of a method for locating on object that transmits locating messages, in accordance with various embodiments.

Various embodiments may determine a distance to, location of, and trajectory of an object, using the methods of synchronizing clocks across a distributed network of nodes described above. FIG. 4 illustrates a method 400 for locating an object that transmits locating messages (e.g., the object 121 in FIG. 1). The method 400 may be performed by a processor, such as a processor within a node or a component thereof (e.g., the monitor and/or the synchronizer) in a distributed network of nodes (e.g. 111, 112, 113, 114), to locate an object (e.g., 121) that is actively and periodically broadcasting signals that may be received as locating messages.

Since an object's data arrives out of synchrony with the synchronized nodes, the nodes need to first determine when the object had broadcast its signal in order to locate its position. Thus, when a node receives and/or detects a signal from an object, that node may immediately broadcast this locally time-stamped event to other nodes. Since the nodes are synchronized with each other, each node will receive the object data from all other nodes within one $\gamma$. As a result, initial precision (time lag) of the object data among the nodes is now $\gamma$. The exchanged object data may be stored locally in a vector V at a node.

To accurately locate the object in accordance with various embodiments, the nodes may execute the following process, which is similar to but a shorter version of Steps 3 and 4, described above, for the invalid Echo message recovery process. As part of the object location process, $D_{ij}$ may be considered the distance between nodes i and j, and $N_f$ may represent the object being located.

In block 410, a sensor of a node in the distributed network of nodes may detect an object. The sensor may detect the object from an active message (i.e., a signal) transmitted from the object or from a detectable signature of the object (e.g., sound, light, heat).

In block 420 in response to the sensor detecting the object in block 410, a processor in the node may use transmitters of the node to broadcast a message regarding the detected object to other nodes. In particular, the processor may use the transmitters to broadcast the message to all neighboring nodes. The neighboring nodes may in-turn rebroadcast the message to additional nodes so that all the nodes in the distributed network of nodes may receive the message regarding the detected object.

In block 430, a processor may determine a time when the object broadcast a received message (e.g., if the object actively transmits a signal) or emitted a detectable signature (e.g., if the object does not actively emit a signal). The processor may use trilateration on entries in V and $D_{ij}$ to determine the time, as described above with regard to faulty Echo message recovery.

In determination block 440, the processor may determine whether conditions "a" or "b" are satisfied. As described above, condition "a" is satisfied when trilateration, using the values in V, results in a closest intersecting point, where any two intersecting points (i.e., temporal values) are within $\delta \geq 0$ of each other (i.e., a solution is determined). When two intersecting points are less than or equal to a clock tick from one another, they are said to converge, which means the difference between two values in V is within $\delta$, $0 \leq \delta \ll \gamma$, and so a solution exists. As also described above, condition "b" is satisfied when trilateration does not converge to a closest intersecting point after $w \geq \pi_{ini}/x$ iterations (i.e., no solution exists). If the closest intersecting points do not converge after $w \geq \gamma/x$ iterations, there does not exist a solution.

The processor may repeat the process in determination block 430, adjusting the value of V with each iteration until either condition "a" or "b" are satisfied. In this way, in response to the processor determining that neither conditions "a" or "b" are satisfied (i.e., determination block 440="No"), the processor may adjust the value of V by a predetermined amount x (e.g., V(i)=V(i)−x, for all i) and increment the iteration counter w in block 445, and then return to block 430 to once again determine a time when the object broadcast the message using the adjusted value of V. The predetermined amount x may be a value between zero and the maximum communication delay $\gamma$. Thus, x may be a fraction or multiple of clock ticks.

In response to the processor determining that condition "a" is satisfied (i.e., there is a solution; determination block 440="a"), the processor may determine a location and/or trajectory of the object in block 450. The processor may equate the intersecting point with the time when the object broadcast its message or emitted the detectable signature. In this way, xw may be the amount of time it took to reach the convergence point and the current content of V holds the broadcast time of the object's message or signature. Since the proper timing of the object data is reflected in the current value of V, the distances between the nodes and the object may be readily computed and the location of the object determined using trilateration. Since the timing values in V are optimum, this localization step does not require further iterations.

The processor may report the location of the object in block 455. In addition, if prior iterations of the method 400 have determined a location of the object, then in block 455 the processor may extrapolate and also report a trajectory of the object.

In response to the processor determining that condition "b" is satisfied (i.e., there is no solution; determination block 440="b"), the processor may determine, in block 460, that the location of the object is indeterminate. Once the processor determines the location of the object is indeterminate, the processor may cease the object location process of the method 400 for the particular object detected in block 410.

Optionally, in optional block 465, the processor may create a record of the indeterminate object location, such as in a register. The record may indicate that a message was received from an object or that an object signature was detected, but that the location and/or trajectory of the object could not be identified.

In some embodiments, the processor may repeat the operations of the method 400 to detect the presence and determine a distance to, location of and trajectory of an object. For example, the processor may repeat the operations of the method 400 continuously or until a predetermined number of received messages from the object confirm that object's location and/or trajectory. Thereafter, the processor may optionally repeat the operations of the method 400 at regular intervals or at other times established for doing so.

Although an object may not actively transmit a locating message and/or signal (e.g., the object 122 in FIG. 2), various embodiments may still locate that object. In accordance with various embodiments, rather than transmit messages (i.e., signals), the object may be assumed to continuously emit a signature, e.g., sound, light, and/or heat emanating from the object. In this way, the object's presence may be detected using visual sensors/cameras at the nodes. Thus, in accordance with various embodiments, when an object does not actively transmit locating signals the synchronized nodes may sample the object's signature at specific time intervals in order to locate the object. To simplify the process, the nodes may sample and exchange object data with each other along with their synchronization message exchange activities, therefore, eliminating the need for timing alignment that was necessary in the method 400. The exchanged object data in this passive object scenario may be stored at a node in a vector V, similar to the way active object data is stored in the method 400.

The reliability and accuracy of a positioning system may fundamentally depend on two factors; the accuracy of its time-synchrony, at the node and network level, and its geometry, i.e., locations and distances of its nodes from each other. Just as geo-location using GPS data is based on the knowledge of the locations and current times of the satellites, current ground-based geo-location solutions are also based on prior knowledge of the exact location of the nodes (e.g., beacons) and the distances between them. The more accurate the data (time and distances), the more accurate the location of the object may be estimated. For instance, ground-based LPS, requires precise knowledge of the location of its beacons and their distances; thus, a survey of the locations of the beacons and their geometry may have to be conducted and the survey results shared by all beacons prior to its intended operation. The requirement of prior knowledge of network geometry imposes a restriction on the applications and precludes scenarios where the nodes are mobile.

In contrast, the self-synchronization protocols, in accordance with various embodiments, are autonomous and not only establish an accurate time-synchrony, they also determine the network geometry (the relative locations and distances of the nodes with respect to each other) without requiring such prior knowledge or the help of an external source. The autonomous distributed fault-tolerant local positioning system presented, therefore, provides added capability for high-dynamic environments, where not only the object is assumed to be mobile and maneuver at high speed, but the nodes are also assumed to be static and/or mobile and their locations, potentially, change as a function of time. The only restriction being that the nodes and the object remain within the maximum communication range of $\gamma$ of each other.

Figure 5A:
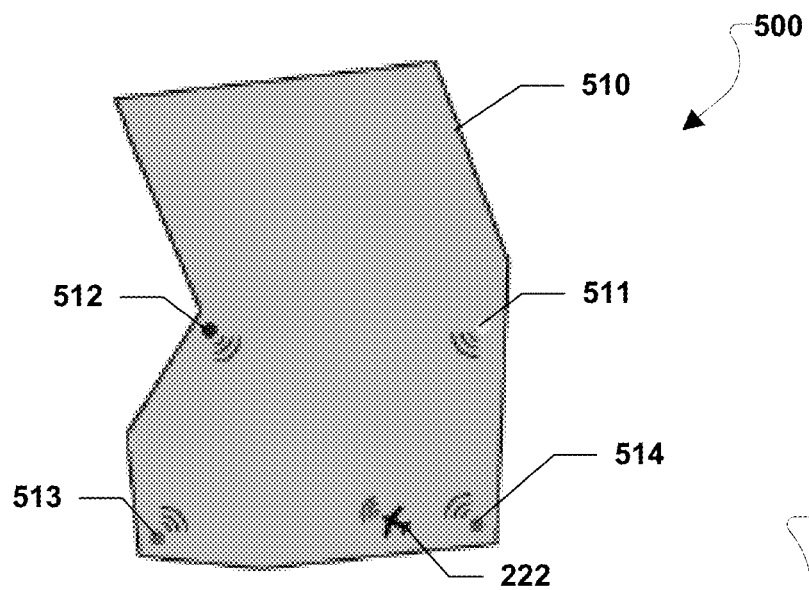
FIGS. 5A, 5B, and 5C illustrate an object functioning as an active participant in a mobile network of nodes for locating the object within the network, according to various embodiments.
Figure 5B:
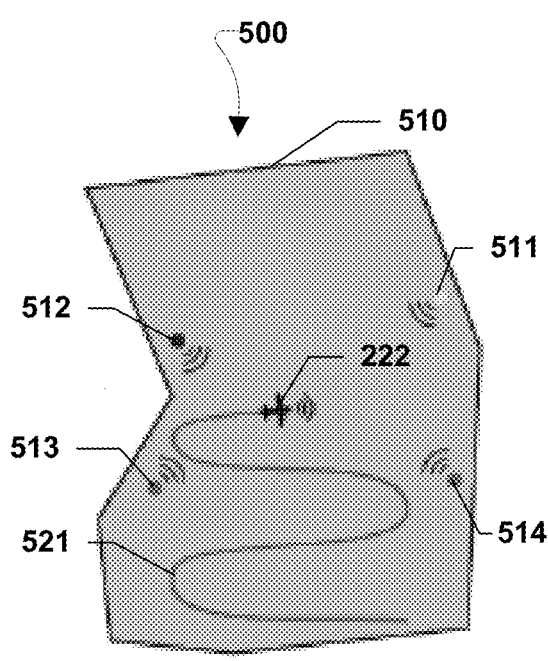
Figure 5C:
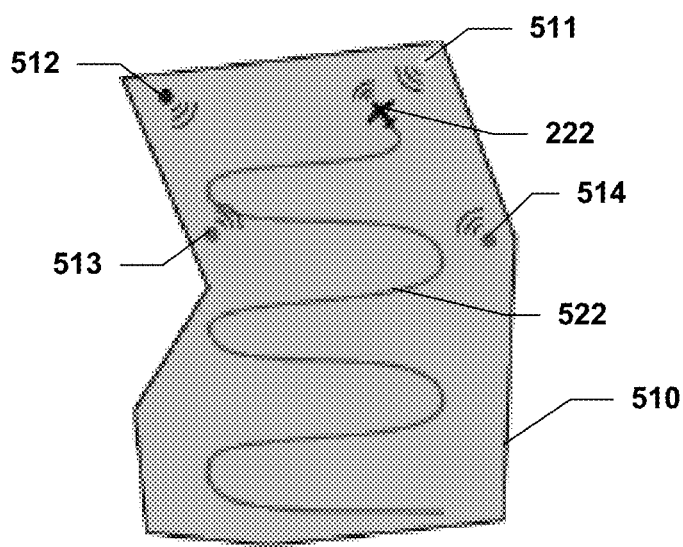

FIGS. 5A-5C illustrate a 2D example of a fully mobile system, where the locations of the nodes 511, 512, 513, 514 and the object 122 change as a function of time. While a 2D example is illustrated, it should be understood that the concept is equally applicable to a 3D environment.

Together the Primary and Secondary protocols described above guarantee bringing a system to a safe (i.e., legitimate) state, even when started from an arbitrary initial configuration, and achieve network level fine synchrony. These protocols may be the building blocks of the autonomous distributed fault-tolerant local positioning system according to various embodiments. The accuracy of the localization provided by this local positioning system may be a function of the frequency of data it broadcasts, e.g., ((x, y, z), t), and the measure of synchrony among its distributed components, which, in turn, is a function of the drift of their local oscillators. Thus, to provide data with the highest accuracy, it may be preferable to have localization data broadcast as frequently as possible and synchrony among the nodes is maintained as often as practicable. Note that performances of the synchronization and localization protocols may be bounded by the communication latency $\gamma$, thus, imposing a limit on broadcast frequency.

As noted above, due to drift in local oscillators, undergoing the periodic resynchronization process is an important part of these protocols. The Congruence property indicates the Primary protocol's successful completion of the resynchronization process, and triggers start of a new round of resynchronization process by the Secondary protocol. Executing these protocols in sequence, however, introduces undesirable hiccups in the system. In the Primary protocol, the LocalTimer is used to provide a jitter-free clock to the higher-level protocols by properly filtering out inherent deviation (hiccup) in the StateTimer during the resynchronization process. During this process, accuracy of the local positioning system data may be less than desired. In addition, as the clocks drift the accuracy of the geo-location data diminishes. Thus, the more the rate of drift of the oscillators, the more frequent the resynchronization process needs to take place. However, if the nodes' local timers maintain a high degree of relative synchrony, the periodic resynchronization process by the Primary protocol may not be necessary. While the need for the resynchronization process may not be fully eliminated, it may be reserved for circumstances when the system experiences unexpected loss of synchrony that will be indicated by the Congruence property.

When the nodes 511, 512, 513, 514 are synchronized, the BI and BE phases of the Secondary protocol (as discussed above with regard to Table 3) each take one $\gamma$ to complete while the RCA phase takes negligible time to compute compared to the communication latency $\gamma$ (see also, Table 5 and related disclosure below). In other words, each iteration of the Secondary protocol takes $2\gamma$ clock ticks. Proper overlapping of the BI and BE phases halves the time interval of iteration of the Secondary protocol, reduces the amount of drift among the local timers of the nodes, thus, maintaining higher synchrony in the system, provides higher frequency and more accurate localization data. Accordingly, various embodiments employ a protocol that is an amalgamation of the Primary and Secondary protocols while eliminating inefficiencies and, at the same time, speeding up the resynchronization process.

Since broadcast frequency is bounded by $\gamma$, for geo-location purposes, localization data may be broadcast periodically at $\gamma$ intervals. However, when augmented by adding an Echo message, it also facilitates maintaining a higher level of relative synchrony in the system. The benefits of this approach far outweigh the extra overhead of adding Echo messages since it eliminates the need to undergo the periodic resynchronization process and the resulting hiccups in the system.

The integration of the two protocols is subtle and based on the idea of augmenting the geo-location data, that includes nodes' local times, ((x, y, z), t), for clock synchronization purposes. To properly integrate the two protocols, the statements ST1 and TS1 of the Primary protocol may need to be modified in order to prevent unnecessary periodic resynchronization after achieving synchrony (see, Table 2, above, and Table 5, below and related disclosures).

TABLE 5

Modification to symmetric-fault-tolerant protocol.

Synchronizer:
ST1: if (StateTimer < 0) or (Accept( )) or (StateTimer ≥ $P_{ST}$ and InSynch)
    StateTimer := 0,  // reset
ST2: elseif (not InSynch)
    if (StateTimer < $P_{ST}$)
        StateTimer := StateTimer + 1
    else
TS1: if (StateTimer ≥ $P_{ST}$) and // timed out
    (TransmitTimer ≥ γ) and
        (not Accept( )) and (not InSynch)
    Transmit Sync.

The integrated self-synchronization protocol is presented in Table 6, below. Start of this protocol may be triggered by the Congruence property when the Primary protocol achieves coarse synchrony.

TABLE 6

The fault-tolerant integrated self-synchronizing protocol.

SnotT: While ((not InTransition) and (InSynch))
    if ((LocalTimer mod □) = 0)
        Recover( ), Adjust( ), UpdateEcho( )
        Broadcast Echo
TnotS: if (InTramition and (not InSynch))
    if (LocalTimer = ψ)
        Broadcast Init
    if (LocalTimer = ω + ψ)
        Broadcast Echo
    if (LocalTimer = 2ω + ψ)
        Recover( ), Adjust( ), UpdateEcho( )
    if (LocalTimer = 3ω)
        InSynch = true
        InTransition = false
        Broadcast Echo The fault-tolerant integrated self-synchronization protocol uses the following parameters:

ω=$π_{init}$+γ, and ψ=ResetLocalTimerAt.

The InTransition function of the integrated self-synchronization protocol may be: (1) set by the Primary protocol, Congruence property; and (2) reset by the Primary protocol when synchrony is lost, Congruence property, or by the Secondary protocol upon completion of the transitory interval, statement TnotS.

The InSynch function of the integrated self-synchronization protocol may be: (1) set by the Secondary protocol upon completion of the transitory interval; and (2) reset by the Primary protocol when synchrony is lost, Congruence property.

Since the Echo message may be broadcast at γ intervals (after achieving network-level synchrony), the Recovery( ) function may be revisited as part of the integration of the Primary and Secondary protocols.

A faulty Echo message manifests as an invalid row in matrix M. Let, at $N_i$, $N_f$ be the faulty node whose corresponding row in M contains no data. Let V be a vector of data associated with all nodes that received valid Init messages from $N_f$ i.e., V is the column f in M and V=M(i,f) =valid. For error detection and recovery purposes, a new matrix, M-New, may be built for the newly arrived messages. If $N_f$ had broadcast in a previous round (equivalent to the Init messages) to sufficient number of good nodes (three/four) but did not broadcast Echo messages, $N_f$ may be recovered using trilateration. The matrix M may be restored using the protocol described in a previous section entitled "Recovering Invalid Echo." With the integrated protocol of Table 6, if the assumptions hold, a node exhibiting faults at every other interval is readily tolerated.

If the nodes are not mobile and the assumptions hold, a simpler (shortcut) solution to recovery is to copy the $N_f$ column/row in the M-New matrix using timing values from its Init message in the M matrix as follows:

$$M\text{-New}(i,N_f)=M(i,N_f) \quad (10)$$

and $$M\text{-New}(N_f,j)=M(N_f,j), \text{ for all } i \text{ and } j \quad (11).$$

The UpdateEcho( ) function may construct the Echo vector, as the messages arrive, in preparation for the next round. For all sources of a messages i, if (InSynch)
    Echo(i) = LocalTimer mod γ
    if Echo(i) = 0
        Echo(i) = γ

An implication of the above modulus operation is that $P_{LT}$ needs to be a multiple of γ to avoid complications arising due to fractions of γ that would result otherwise.

Figure 6:
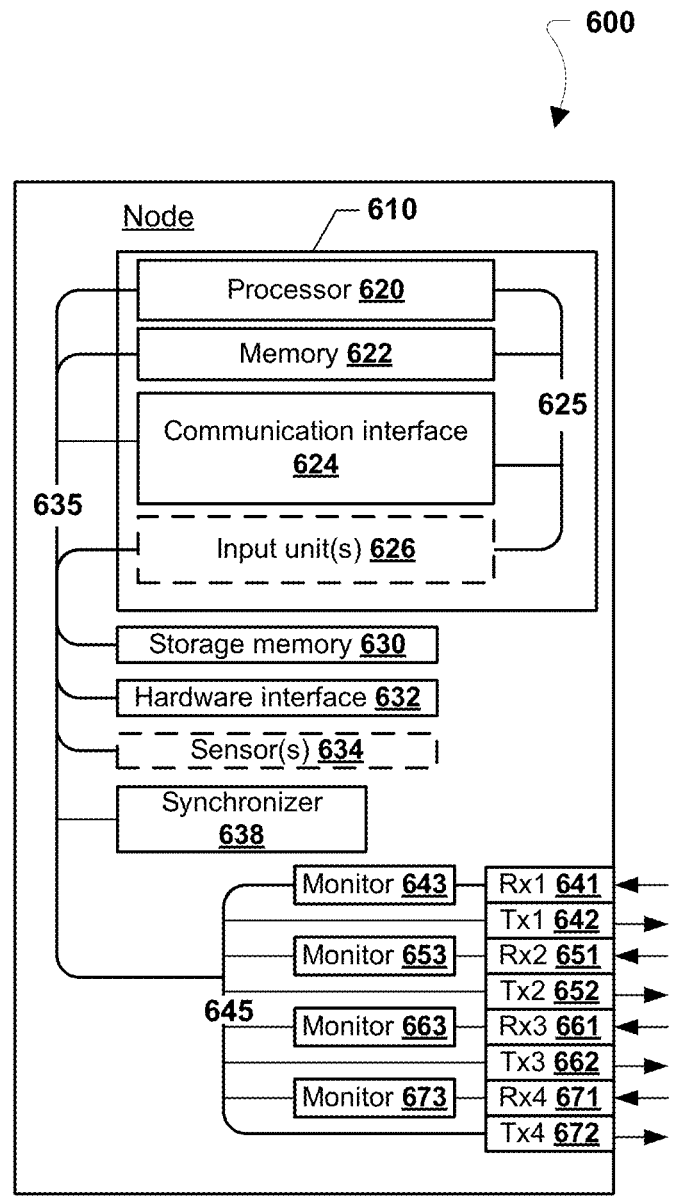
FIG. 6 illustrates a schematic block diagram of an exemplary node, in accordance with various embodiments.

FIG. 6 is a block diagram of a node 600 in a distributed network of nodes according to various embodiments. The node 600 may include a processing device 610 configured to control the various functionalities, sub-systems, and components of the node 600. For example, the processing device 610 may be configured to control various modules, software, instructions, circuitry, hardware, etc. related to propulsion, navigation, power management, sensor management, and/or stability management.

The processing device 610 may house various circuits and devices used to control the operation of the node 600. For example, the processing device 610 may include a processor 620 that directs the control of the node 600. The processor 620 may include one or more processors configured to execute processor-executable instructions (e.g., applications, routines, scripts, instruction sets, etc.) to control timing and other determinations and other operations of the node 600, including operations of various embodiments.

In some embodiments, the processing device 610 may include memory 622 coupled to the processor 620 and configured to store data (e.g., network data, obtained sensor data, received messages/inputs, applications, etc.). The processor 620 and memory 622 may be configured as or be included within a system-on-chip (SoC) along with additional elements such as (but not limited to) a communication interface 624, and optionally one or more input units 626. Components within the processing device 610 may be coupled together by various circuits, such as a bus 625 or another similar circuitry.

The processing device 610 may include more than one processor, each configured for specific purposes that may be the same as or different from other processors of the processing device 610. One or more of the processors and/or processor cores of the same or different configurations may be grouped together. A group of processors or processor cores may be referred to as a multi-processor cluster.

In some embodiments, the node 600 may also include additional buses 635, 645 for coupling to other components thereof. For example, the node 600 may additionally include non-volatile storage memory 630 and a hardware interface 632 configured to interface the processing device 610 with hardware and components of the node 600. The node 600 may optionally include one or more sensors 634 for detecting objects. The sensor(s) 634 may be tailored to the object's signature or a signal broadcast by the object (e.g., passive radar). The sensor(s) may detect sound, light, motion, heat, and/or other detectable elements of an object.

In some embodiments, the node 600 may include a synchronizer 638 and a set of monitors 643, 653, 663, 673. To assess the behavior of other nodes, each node 600 may employ as many monitors as the number of nodes that are directly connected to it, with one monitor 643, 653, 663, 673 for each source of incoming message received through a corresponding receiver Rx1 641, Rx2 651, Rx3 661, Rx4 671. Each monitor 643, 653, 663, 673 keeps track of the activities of its corresponding source node. Valid Sync messages may be conveyed to the synchronizer 638. The assessment results of the monitored nodes are then utilized by the synchronizer 638 to perform various function of the synchronization process. The monitors 643, 653, 663, 673 may also dispose of the valid messages after their life-span expires.

In addition, the node 600 may include a set of transmitters Tx1 642, Tx2 652, Tx3 662, Tx4 672 configured to transmit messages (i.e., signals) to nodes that are directly connected to the node 600 (i.e., neighboring nodes). The messages transmitted from the node 600 may be relayed from neighboring nodes to additional nodes in the network through one or more node hops. Similarly, messages from remote nodes may be received by the receivers Rx1 641, Rx2 651, Rx3 661, Rx4 671 after being relayed through neighboring nodes, as well as any intermediate nodes.

The node 600 may include as many receiver/transmitter pairs as it has neighboring nodes to which the node 600 is directly connected. Although the node 600 is illustrated as having four (4) receiver/transmitter pairs, it should be understood that the node may include a greater or fewer number of receiver/transmitter pairs. Alternatively, the node 600 may include fewer receiver/transmitter pairs than neighboring nodes to which the node 600 is directly connected. In this way, some connections to neighboring nodes may share a common receiver/transmitter pair. While a node that shares a receiver/transmitter pair for more than one neighboring node may not be optimal, it may still work.

In various embodiments, the nodes may be configured for a wireless communication environment. In such a wireless communication environment, a node may use one transmitter to communicate with more than one other node, and may need a one-to-many relationship to receivers of other nodes (i.e., one receiver for communicating with each other node). It should be noted that various embodiments may be suitable for a wired communication environment. In contrast to the wireless communication environment, in a wired communication environment the node may need to have a one-to-one relationship for each transmitter-receiver pair between any two nodes.

In various embodiments, the node described above in association with a distributed network of similar nodes has several advantages. For example, mechanisms are provided for clock synchronization across a distributed network of nodes and geo-locating static and/or mobile objects within the network. The methods and/or network of nodes may recover from a single point of failure and/or fault manifestations. Various embodiments improve the reliability and accuracy of a distributed network of nodes used as a positioning system by maintaining clock synchronization from broadcast signals and the knowledge of its network geometry (i.e., locations and distances between beacons). A distributed network of nodes, in accordance with various embodiments, may be used for search and rescue applications in which searching vessels may operate at nodes and/or a searched for object within a network of nodes may be located. Similarly, a distributed network of nodes, in accordance with various embodiments, may be used in a warehouse or an open-cut (i.e., open pit) mine for object detection and/or location.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Terms such as "first" and "second" are used herein to distinguish similarly named elements and are not intended to limit the various embodiments to a particular order, sequence, and/or type of network or node.

The various illustrative logical blocks, modules, circuits, protocols, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method, protocol, or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method, protocol, or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of synchronizing clocks internally across a distributed network of nodes, comprising:
   determining, by a processor of a first node in the distributed network of nodes, a distance between a plurality of nodes in the distributed network of nodes, wherein the plurality of nodes for which the distance between is determined does not include a second node associated with a faulty Echo message, wherein each node in the distributed network of nodes broadcasts an Echo message including a vector of locally time-stamped events to other nodes in the distributed network of nodes;
   determining, by the processor, a time when the faulty Echo message was broadcast using trilateration of temporal values and locations associated with the plurality of nodes; and
   broadcasting a recovered Echo message, by a transmitter of the first node, based on the determined time when the faulty Echo message was broadcast to other nodes in the distributed network of nodes.

2. The method of claim 1, wherein the other nodes in the distributed network of nodes to which the determined time is broadcast include all neighboring nodes of the first node.

3. The method of claim 1, further comprising:
   receiving, by at least one monitor of the first node, individual Echo messages from each of the other nodes in the distributed network of nodes;
   determining, by the processor, whether each of the individual Echo messages are valid;
   storing each of the received Echo messages that are determined to be valid;
   determining, by the processor, whether a threshold number of the received Echo messages have been stored;
   determining, by the processor, an adjustment to a local time of the first node in response to the threshold number of the received Echo messages being stored; and
   broadcasting, by the transmitter, the determined adjustment to the local time to other nodes in the distributed network of nodes.

4. The method of claim 1, further comprising:
   detecting, by a sensor of the first node in the distributed network of nodes, a message or signature from an object within a region of the distributed network of nodes;
   broadcasting, using the transmitter, a message regarding the detected message or signature to other nodes within the distributed network of nodes;
   determining, by the processor, whether a time may be calculated that corresponds to when the object broadcast the received message or emitted the detected message signature based on the message or signature from the object;
   determining, by the processor, a value for the time when the object broadcast the received message or emitted the signature in response to determining the time may be calculated; and
   reporting, using the transmitter, a location of the object based on the determined value for the time when the object broadcast the received message or emitted the signature.

5. The method of claim 4, wherein the time may be calculated in response to performing trilateration, using values from the received message, results in any two intersecting temporal values being less than an amount of imprecision.

6. The method of claim 4, further comprising:
   reporting, using the transmitter, that the message was received from the object but that the object could not be localized in response to determining the time may not be calculated.

7. The method of claim 4, further comprising:
   determining, by the processor, a trajectory of the object based on values determined for the times when the object broadcast multiple messages received by the first node; and
   reporting, using the transmitter, the trajectory.

8. The method of claim 4, wherein the received message is actively transmitted from the object.

9. The method of claim 4, wherein the object is configured to receive messages from the first node but unable to actively transmit the message to the first node.

10. The method of claim 4, further comprising:
    adjusting, by the processor, a value associated with the message or signature from the object in response to determining the time may not be calculated.

11. The method of claim 4, further comprising:
    determining, by the processor, a recovery value in place of a faulty value from the received message, wherein the recovery value is determined from information obtained from other nodes between the object and the other node from which a valid message has been received.

12. A node in a distributed network of nodes, wherein the network is synchronized internally, the node comprising:
   a plurality of receiver and transmitter pairs, wherein each of the receiver and transmitter pairs is configured to receive messages from and transmit messages to at least one other node in the distributed network of nodes; and
   a processor coupled to the plurality of receiver and transmitter pairs and configured with processor-executable instructions to:
      determine a distance between a plurality of nodes in the distributed network of nodes, wherein the plurality of nodes for which the distance between is determined does not include a second node associated with a faulty Echo message, wherein each node in the distributed network of nodes broadcasts an Echo message including a vector of locally time-stamped events to other nodes in the distributed network of nodes;
      determine a time when the faulty Echo message was broadcast using trilateration of temporal values and locations associated with the plurality of nodes; and
      causing a plurality of transmitters, of the plurality of receiver and transmitter pairs, to broadcast a recovered Echo message based on the determined time when the faulty Echo message was broadcast to other nodes in the distributed network of nodes.

13. The node of claim 12, wherein each of the plurality of receiver and transmitter pairs communicates with a different node of the plurality of nodes.

14. The node of claim 12, wherein the other nodes in the distributed network of nodes to which the determined time is broadcast include all neighboring nodes.

15. The node of claim 12, further comprising:
   a plurality of monitors coupled to the processor, wherein each of the monitors is configured to receive individual Echo messages from at least one of the other nodes in the distributed network of nodes, wherein each of the monitors is configured with processor-executable instructions to:
      determine whether each of the individual Echo messages are valid;
      store each of the received Echo messages that are determined to be valid;
      determine whether a threshold number of the received Echo messages have been stored;
      determine an adjustment to a local time of the node in response to the threshold number of the received Echo messages being stored; and
      cause the plurality of transmitters of the node to broadcast the determined adjustment to the local time to other nodes in the distributed network of nodes.

16. The node of claim 12, further comprising:
   a sensor coupled to the processor, wherein the sensor is configured to detect a message or signature from an object within a region of the distributed network of nodes, wherein the processor is further configured with processor-executable instructions to:
      cause the plurality of transmitters to broadcast a message regarding the detected message or signature to other nodes within the distributed network of nodes;
      determine whether a time may be calculated that corresponds to when the object broadcast the received message or emitted the detected message signature based on the message or signature from the object;
      determining a value for the time when the object broadcast the received message or emitted the signature in response to determining the time may be calculated; and
      cause the plurality of transmitters of the node to broadcast a location of the object based on the determined value for the time when the object broadcast the received message or emitted the signature.

17. The node of claim 16, wherein the processor is further configured with processor-executable instructions such that the time may be calculated in response to performing trilateration, using values from the received message, results in two intersecting temporal values being less than an amount of imprecision.

18. The node of claim 16, wherein the processor is further configured with processor-executable instructions to:
   cause the plurality of transmitters to transmit a report that the message was received from the object but that the object could not be localized in response to determining the time may not be calculated.

19. The node of claim 16, wherein the processor is further configured with processor-executable instructions to:
   determine a trajectory of the object based on values determined for the times when the object broadcast multiple messages received by the node; and
   cause the plurality of transmitters to relay the trajectory to the other nodes in the distributed network of nodes.

20. A non-transitory computer-readable storage medium having stored thereon processor-executable software instructions configured to cause a first node in a distributed network of nodes wherein the network is synchronized internally, the node to perform operations comprising:
   determining a distance between a plurality of nodes in the distributed network of nodes, wherein the plurality of nodes for which the distance between is determined does not include a second node associated with a faulty Echo message, wherein each node in the distributed network of nodes broadcasts an Echo message including a vector of locally time-stamped events to other nodes in the distributed network of nodes;
   determining a time when the faulty Echo message was broadcast using trilateration of temporal values and locations associated with the plurality of nodes; and
   broadcasting a recovered Echo message based on the determined time when the faulty Echo message was broadcast to other nodes in the distributed network of nodes.

* * * * *